United States Patent [19]

Collins, Jr.

[11] Patent Number: 4,770,455
[45] Date of Patent: Sep. 13, 1988

[54] PASSIVELY ACTIVATED PREHENSILE DIGIT FOR A ROBOTIC END EFFECTOR

[75] Inventor: Earl R. Collins, Jr., La Canada, Calif.

[73] Assignee: The United States of America as represented by the Administrator of the National Aeronautics and Space Administration, Washington, D.C.

[21] Appl. No.: 921,577

[22] Filed: Oct. 21, 1986

[51] Int. Cl.⁴ .................. B65G 17/46; B65G 35/00
[52] U.S. Cl. .................................. 294/88; 294/902; 269/267
[58] Field of Search ............... 294/88, 86.4, 116, 902, 294/95, 106, 97, 115, 119.3, 89.1, 99.1; 901/30, 31, 39; 269/32, 90, 224, 265, 266, 267, 275; 414/729, 744 A; 623/65, 66, 57

[56] References Cited

U.S. PATENT DOCUMENTS

| | | | |
|---|---|---|---|
| 2,882,771 | 4/1959 | Blazek | 81/38 |
| 3,908,318 | 9/1975 | Wallin | 51/240 |
| 4,284,267 | 8/1981 | Marben | 269/266 |
| 4,558,911 | 12/1985 | Ruoff | 339/5 |
| 4,609,220 | 9/1986 | Scott | 294/902 |
| 4,653,793 | 3/1987 | Guinot et al. | 294/88 |

FOREIGN PATENT DOCUMENTS 5213275 7/1975 Japan .
639696 7/1950 United Kingdom ............... 269/267
889423 12/1981 U.S.S.R. .

OTHER PUBLICATIONS

IBM Technical Disclosure Bulletin, vol. 19, No. 6, Nov. 1976, pp. 2121-2122.
Popular Science, Oct. 1985, p. 16.

Primary Examiner—James B. Marbert
Attorney, Agent, or Firm—Paul F. McCaul; John R. Manning; Thomas H. Jones

[57] ABSTRACT

A common hydraulic reservoir holds one or more rows of slidable pistons or "fingers" in a base, or "hand". The individual fingers in each row expose graduated cross-sectional fluid application areas to the hydraulic fluid in the reservoir, with the smallest fluid application area in the center of the row and graduating to progressive larger fluid areas towards both ends of each row. The fingers are elongated pistons. Exposed outer ends of each piston extending away from the reservoir, house a transverse pad to contact an object to be held. The transverse pads are universally ball-joint and spring-center mounted in a longitudinally located opening at the outer tapered end of each finger. Simple and effective capacitance metering in the reservoir is provided for each finger.

19 Claims, 2 Drawing Sheets

PASSIVELY ACTIVATED PREHENSILE DIGIT FOR A ROBOTIC END EFFECTOR

ORIGIN OF THE INVENTION

The invention described herein was made in the performance of work under a NASA contract, and is subject to the provisions of Public Law 96-517 (35 USC 202) in which the Contractor has elected not to retain title.

FIELD OF THE INVENTION

This invention relates to workpiece gripping and more particularly relates to a gripping unit for conforming the end of a robotic end effector to an object to be held by the end effector.

BACKGROUND OF THE INVENTION

End effectors, or hands, for robotic arms continue to be a limiting element for efficient use. The "fingers" are usually formed with flat gripping surfaces, or specially shaped for specific use on singular items. There are semi-universal hands with gripper mechanisms driven by pneumatics, cams, or cables, remotely controlled by computer and requiring feedback of gripping force from force/torque sensors.

One example of a universal hand is the three-finger hand disclosed in U.S. Pat. No. 4,558,911. Each finger has three joints that are driven by cable "tendons," each equipped with a cable tension sensor to prevent slack. Since each finger requires the control of several cables and use of force/torque sensing, the computerized control of the hand of the U.S. Pat. No. 4,558,911 is rather complex.

In order to grip an object, such as a ball, without crushing or damage to the ball, all cables must be simultaneously controlled for all three fingers. While the hand of the U.S. Pat. No. 4,558,911 can hold a wide variety of objects without changing grippers, the complexity of control may present some disadvantages.

It is known to employ a plurality of pistons housed in cylinders and fed by hydraulic fluid to confrom without feedback or active control, to a workpiece. In a multi-piston closed hydraulic system, loading one piston will cause a pressure to be exerted equally on all other pistons, and they will move outwards in proportion to their share of the volume displaced by the loaded piston. All unloaded pistons of the same diameters move out equal distances and exert equal forces against any encountered load.

U.S. Pat. No. 2,882,771 to Blazek discloses a workpiece holder having a plurality of fingers, or pistons, 11 and 12 extending outwardly from hydraulically-driven cylinders 9 and 10 as shown in FIGS. 4 and 5 thereof. The cylinders in Blazek U.S. Pat. No. 2,882,771 are interconnected by a common hydraulic fluid reservoir. As pressure is exerted by a workpiece on one of the fingers, that finger retracts and an outward force is thus equally applied to the other fingers as described at column 2 lines 15 through 35. A somewhat similar type of operation is disclosed in U.S. Pat. No. 4,284,267 to Marben for opposed faces of a vice. See FIG. 3 and column 4, lines 5 through 12.

Some variations of the above-described hydraulic principle are disclosed in Japanese Pat. No. 52-13275; Russian Pat. No. 889,423 and U.S. Pat. No. 3,908,318 to Wallin. The Russian patent applies the known hydraulic reservoir technique to a robot end effector.

In all of the prior art common reservoir disclosures, the pistons provide the same area to the hydraulic fluid, and thus move the same distance in response to equal hydraulic force.

The IBM Technical Disclosure Bulletin Vol. 19 No. 6 November 1976, pages 2121–2122 shows pivoting pads or chucks 12 mounted on the ends of fingers or shafts 14. See FIG. 1c and the second paragraph of page 2121. The pivot is very slight, no centering spring is taught or disclosed, and a hydraulic reservoir system is not disclosed.

An article published at page 16 in the October 1985 issue of Popular Science discloses a robot gripper, which is described as: "Two fingerlike arrays, each composed of 127 telescoping pins that can ride up or down independently." This article is not considered prior art. However even if it is prior art, the disclosure implies either the common hydraulic principle or independent spring-loaded pins.

SUMMARY OF THE INVENTION

It is a feature of this invention to provide a highly versatile robotic end effector having graduated finger travel and force across its surface together with biased and return-oriented finger tips for an enhanced gripping ability.

A common hydraulic reservoir holds one or more rows or slidable pistons or "fingers" in a base, or "hand". The individual fingers in each row expose graduated cross-sectional fluid application areas to the hydraulic fluid, starting with the smallest finger area in the center of the row and graduating to progressively larger finger areas towards both ends of each row. Simple and effective capacitance metering in the reservoir is provided for each finger tip.

The hand, relative to an object to be grasped, is concave shaped with the lowest part of the concave shape being located at the center of the row to readily accommodate the greatest finger travel at the center of each row. The fingers are elongated pistons. Exposed outer ends of each piston house a transverse pad. The transverse pads are universally ball-joint mounted in a longitudinally located opening at the outer tapered end of each finger. Essentially 270° or more of pad angle action is provided for, and the pads are self-centering and biased for conformance to the object to be held. The reservoir end of the fingers provide electrical metering elements between the finger and the base of the reservoir. These metering elements supply electrical feedback signals if so desired.

DETAILED DESCRIPTION OF THE DRAWING

Figures 1, 2:
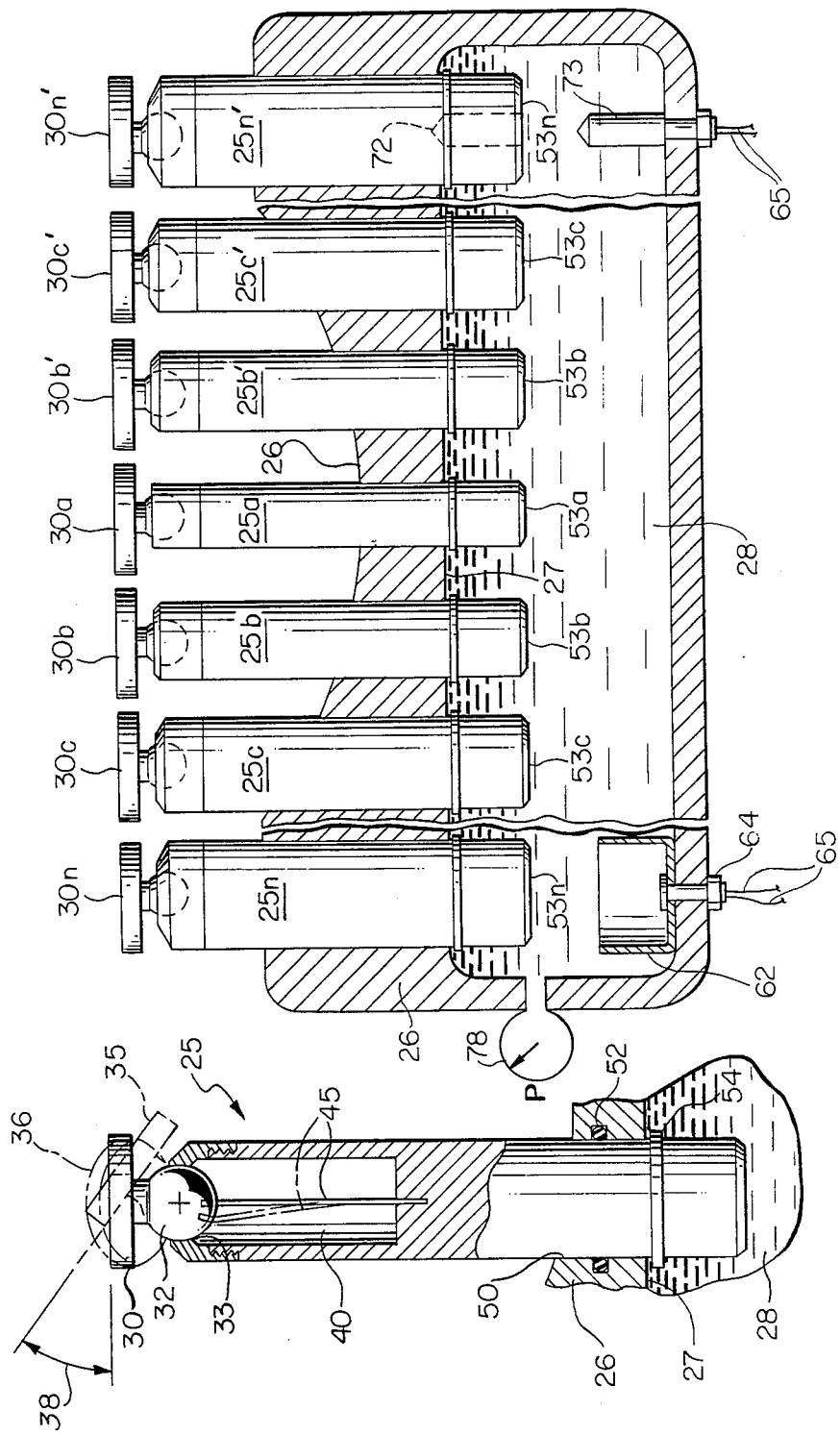
FIG. 1 is a partial cross sectional view of a typical piston, or finger, of this invention.
FIG. 2 is a cross sectional view of one row of fingers in a base, or "hand", of this invention.
Figure 3A:
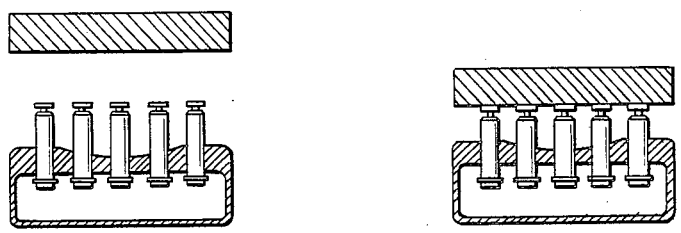
FIGS. 3a, 3b, 3c and 3d which shows how one base will conform to several different surfaces with FIG. 3a illustrating a flat surface, FIG. 3b a round surface, FIG. 3c an irregular surface and FIG. 3d a concave surface.
Figure 3B:
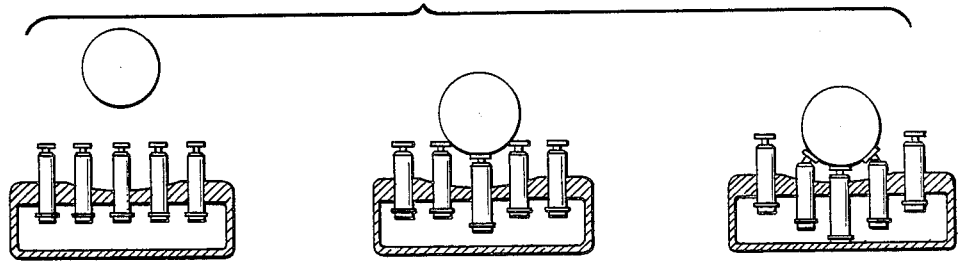
Figure 3C:
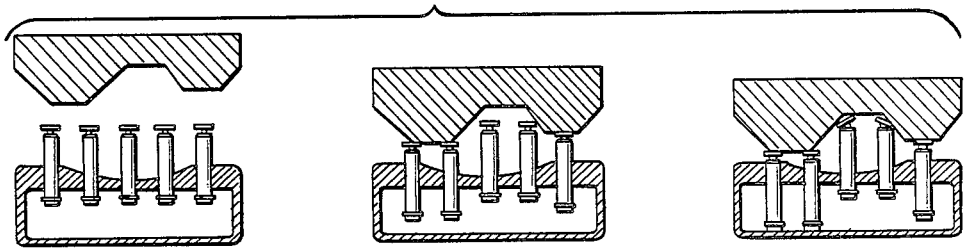
Figure 3D:
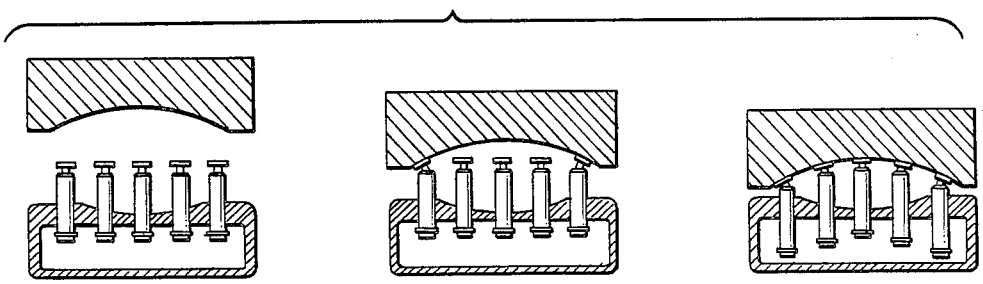

FIG. 1 is a cross-sectional view of a typical piston 25 (not to scale) of this invention. The outer exposed part of piston 25 projects upwardly from the upper surface 26 of a sealed hydraulic chamber 27. Piston 25 carries at its outer exposed end, a ball-jointed-mounted pad 30. The upper flat portion of pad 30 is molded or otherwise formed to a ball joint 32. Ball joint 32 sits within a mated spherical seat 33 formed in, or otherwise fastened to, the exposed and tapered top of piston 25. As shown by dashed lines 35 and 36, pad 30 is capable of universal tipping through substantial angles such as horizontal angle 38. Dashed lines 36 show pad 30 tilted into the plane of the paper through another angle of the same amount.

Located within an upper coaxial bore 40 is a circular and elongated centering spring 45, which spring is suitably seated at one end in the bottom of bore 40 and is seated at the top end in ball 32. Circular spring 45 serves both to mechanically bias and return ball joint 32 to its normal unloaded position as depicted by the solid lines in FIG. 1. The capability of moving through essentially 270 degress of spherical freedom provides the pad 30 with a wide range of gripping and supporting capability for conforming to diverse shaped objects to be moved by the robot end effector of this invention.

The bottom portion of piston 25 is slidably seated into a snug fitting cylinder bore 50 located in body 26. Sufficient clearance is provided to allow freedom of longitudinal movement of piston 25 in the vertical bore 50. One or more o-ring seals 52 of conventional design assure that the hydraulic fluid 28 is suitably sealed in chamber 27. The bottom area 53 of piston 25 is exposed to hydraulic pressure. A suitable stop ring 54 is formed integrally or snapped into position in a receiving grove located near the bottom end of position 25.

FIG. 2 is a cross-sectional view of a hand with a plurality of "fingers" or pistons $25_a$, $25_b$, $25_{b'}$, . . . $25_{n'}$. Hydraulic reservoir 27 is integral with the robot hand body 26 and contains a fluid 28. Pads $30_a$, $30_b$, $30_{b'}$, etc. define a gripping surface for the digit capable of adaptation to a broad range of local surface shapes and slopes. Note that although not drawn to scale each of the piston diameters and thus areas $53_{n'}$, $53_{c'}$ etc. decrease from the edges of hand 26 towards the center $25_a$ and smallest area $53_a$ of the piston array. Thus, the center piston $25_a$, being smaller in diameter than the outer pistons $25_n$, $25_{n'}$, moves, a different distance than the outer ones as hydraulic reservoir pressure is raised. Since the piston diameters vary, the forces on the pistons are not uniformly distributed along the contact face, but vary with the square of the piston diameters. The physical dimensions means that piston $25_a$ exerts a smaller force than the progressively larger area pistons $25_b$, $25_{b'}$, etc.

Although not necessary for this invention, positional feedback of the individual fingers is readily and simply provided by capacitance metering. As shown in FIG. 2, piston $25n$ on the left depicts one form of capacitance metering means wherein the capacitor "plates" consist of an open circular ring 62 slightly larger than the piston's circumference. As piston $25n$ moves further and further into the ring 62, the capacitance increases. The hydraulic fluid 28 acts as a dielectric between the outer ring plate 62 and the outer surface of piston $25n$. Plate 62 is held in position and insulated from base 26 by any suitable insulation bushing (not shown), washers and fastening means such as a threaded bolt and nut combination 64. Leads 65 senses the variations of capacitance on plate 62 as piston $25n$ moves further and further into ring 62. The capacitance varies as a well known mathematical expression related to plate area. Curves are readily available to relate the capacitance valves sensed at leads 65 to variations in movement of piston $25_n$.

Piston $25_{n'}$ on the right in FIG. 2 depicts a variation in a capacitance metering device wherein the capacitor plates 72 and 73 are formed by a coaxial bore 72 in piston $25_{n'}$ and a slightly undersized post 73 which is suitably insulated and mounted in base 26. One or the other of the capacitance meters may be employed. By measuring the pressure P variations in the hydraulic reservoir 27, by any suitable pressure gauge 78, additional information pertaining to the weight of the object may be determined. Furthermore using two hands and rotating them will allow the object to center; and studying the individual piston's feedback information will sense the characteristics of the object, such as its center of gravity and whether it is hard or soft material.

FIGS. $3a$, $3b$, $3c$ and $3d$ present a group of four sequential-action diagrams of the passive, self-activated universal gripping system of this invention as differenct shapes are grasped. In Case $3_a$ a flat surface is contacted by the gripper system of this application. Note that all pads contact the work object simultaneously. This is the usual case for existing flat-surface grippers for robots. If contact to the object is made at an angle, the workpiece will, by this invention, be rotated into parallel alignment automatically.

In Case $3_b$ the fingers approach a smaller round surface—such as a sphere or a cylinder. Initial contact is made by the smaller-diameter center piston. It thus tends to travel further—under the same applied finger closing force—than the other pistons, and will allow the round surface to 'sink' in further for a more secure grip. The hydraulic pressure this movement of the center piston generates, moves its neighbor pistons out to meet the cylindrical surface. As these neighbors contact the workpiece, their pads tilt to the local slope, as shown in the last diagram on the right in FIG. $3_b$. It is important to note the extreme pad angle tilt afforded by the spring-loaded and tapered piston feature of this invention. That large pad action angle is depicted in the diagram on the right for Case $3_b$.

Case $3_c$ illustrates the accommodation of the gripper system to an irregular surface. Case $3_d$ shows accommodation to a concave surface. Although not shown graphically, there is a tendency for symmetrical objects with simple shapes—such as in Cases $3_b$ and $3_d$, to cause centering of the workpiece within the pad array. This centering is caused by the graduation of forces from the center of the array outwards. An off-center object is subjected to higher forces at the side furthest from center and thus the object is moved toward the center. The tilted surfaces exert a lateral and inwardly directed component of force. With pads designed to permit some slippage, the workpieces slide inwardly. This same graduation of forces within the array tends to inhibit rolling of the workpiece. Thus, the workpiece held by this invention is cradled securely wthin the grasp of the pads without exerting unnecessary force.

The total grasp force may be simply and reliably instrumented by any known pressure sensing device with access to the reservoir. No other sensing or control is required. Control is simplified, and gripping and centering for this invention is essentially autonomous.

The above description presents the best mode contemplated in carrying out my invention. My invention is, however, susceptible to modifications and alternate constructions from the embodiments shown in the drawings and described above. Consequently, it is not the intention to limit the invention to the particular embodiments disclosed. On the contrary, the invention is intended and shall cover all modifications, sizes and alternate constructions falling within the spirit and scope of the invention, as expressed in the appended claims when read in light of the description and drawings.

What is claimed is:

1. A workpiece holder having a plurality of pistons slidably mounted in a row of bores in a closed hydraulic reservoir system, with one end of each piston extending into and urged out of hydraulic fluid in the reservoir by pressure thereon and the other end of each piston extending outwardly away from the hydraulic reservoir to receive an object to be held, said holder comprising:
   a plurality of pistons each of which have individual hydraulic pressure areas in the ends thereof exposed to said hydraulic pressure and differeing in size from piston to piston; and
   a plurality of spring loaded workpiece contact pads, each pad universally mounted on the outer ends of said plurality of pistons and tiltable through substantial spherical angles for contact with irregular shaped objects.

2. A workpiece holder as defined in claim 1 and further comprising:
   a graduated series of different sized pressure areas on said row of pistons with the largest hydraulic pressure areas on the outer end of said row and the smallest hydraulic pressure areas near the center of said row.

3. A workpiece holder as defined in claim 1 and further comprising:
   a coaxial bore in the outwardly exposed end of each piston and terminating in an outwardly facing spherical seat;
   a mated spherical ball formed on the underside of a contact pad and universally seated in said spherical bore; and
   a centering spring connected between said bore and said spherical ball for biasing said contact pad into a normally transverse position to said piston.

4. A workpiece holder as defined in claim 3 and further wherein:
   said centering spring is an elongated cylinder seated at one end in the center of the base of said bore and seated at the other end in the center of said ball.

5. A workpiece holder as defined in claim 1 and further wherein:
   said outer ends of said pistons are tapered at said universally mounted area to provide essentially 270° of spherical movement by said contact pads.

6. A workpiece holder as defined in claim 1 and further comprising:
   means in said reservoir for sensing the degree of movement of each of said pistons in said reservoir housing.

7. A workpiece holder as defined in claim 6 and further wherein:
   said movement sensing means comprises a capacitance having one capacitor plate formed on said piston end and spaced away from another capacitor plate held in said reservoir.

8. A workpiece holder as defined in claim 7 and further wherein:
   said capacitor relies upon said hydraulic fluid as a dielectric.

9. A workpiece holder as defined in claim 7 and further wherein:
   said one capacitor plate is formed by an outside circumference on the lower end of said piston and the other capacitor plate is a slightly oversized metal sleeve coaxially aligned and spaced from said lower end.

10. A workpiece holder as defined in claim 7 and further wherein:
    said one capacitor plate is formed by an inner surface of a longitudinal bore in the lower end of said piston and the other capacitor plate is a slightly undersized post coaxially aligned with and spaced from said bore.

11. A workpiece holder as defined in claim 7 and further wherein:
    said movement sensing means comprises a capacitance having one capacitor plate formed on said piston end and spaced away from another capacitor plate held in said reservoir.

12. A workpiece holder as defined in claim 11 and further wherein:
    said capacitor relies upon said hydraulic fluid as a dielectric.

13. A workpiece holding device having a common hydraulic fluid reservoir with a plurality of cylinder bores slidably housing a plurality of pistons extending into said reservoir and extending outwardly away therefrom, said device comprising:
    a plurality of pistons each of which expose graduated pressure areas to said fluid with the areas differing in size from piston to piston, and
    spring loaded workpiece gripping pads universally mounted on the outer ends of said pistons for exerting a graduated reaction force to an object to be held.

14. A workpiece holder as defined in claim 13 and further comprising:
    a coaxial bore in the outwardly exposed end of each piston and terminating in an outwardly facing spherical seat;
    a mated spherical ball formed on the underside of a contact pad and universally seated in said spherical bore; and
    said spring loaded gripping pad further comprises a centering spring connected between said bore and said spherical ball for biasing said contact pad into a normally transverse position to said piston.

15. A workpiece holder as defined in claim 14 and further wherein:
    said centering spring is an elongated cylinder seated at one end in the center of the base of said bore and seated at the other end in the center of said ball.

16. A workpiece holder as defined in claim 13 and further wherein:
    said outer ends of said pistons are tapered at said universally mounted area to provide essentially 270° of spherical movement by said contact pads.

17. A workpiece holder as defined in claim 13 and further comprising:
    means in said reservoir for sensing the degree of movement of each of said pistons in said reservoir housing.

18. A workpiece holding device having a common hydraulic fluid reservoir with a plurality of cylinder bores slidably housing a plurality of pistons extending into said reservoir and extending outwardly away therefrom, said device comprising:
    a row of pistons each of which expose graduated pressure areas to said fluid;

a graduated series of different sized pressure areas on said row of pistons with the largest hydraulic pressure areas on the outer end of said row and the smallest hydraulic pressure areas near the center of said row, and spring loaded workpiece gripping pads universally mounted on the outer ends of said pistons for exerting a graduated reaction force to an object to be held.

19. A workpiece holder in accordance with claim 18 wherein:

the upper surface of the base forming the hydraulic reservoir is concave with the smallest area piston located in the low point of the concave surface and the largest sized area pistons located at the highest points of the concave surface.

* * * * *